June 29, 1954  J. R. FRIESEN  2,682,367
WEIGHT AND BALANCE CALCULATOR FOR LOAD CARRYING STRUCTURES
Filed Oct. 30, 1951  2 Sheets-Sheet 1
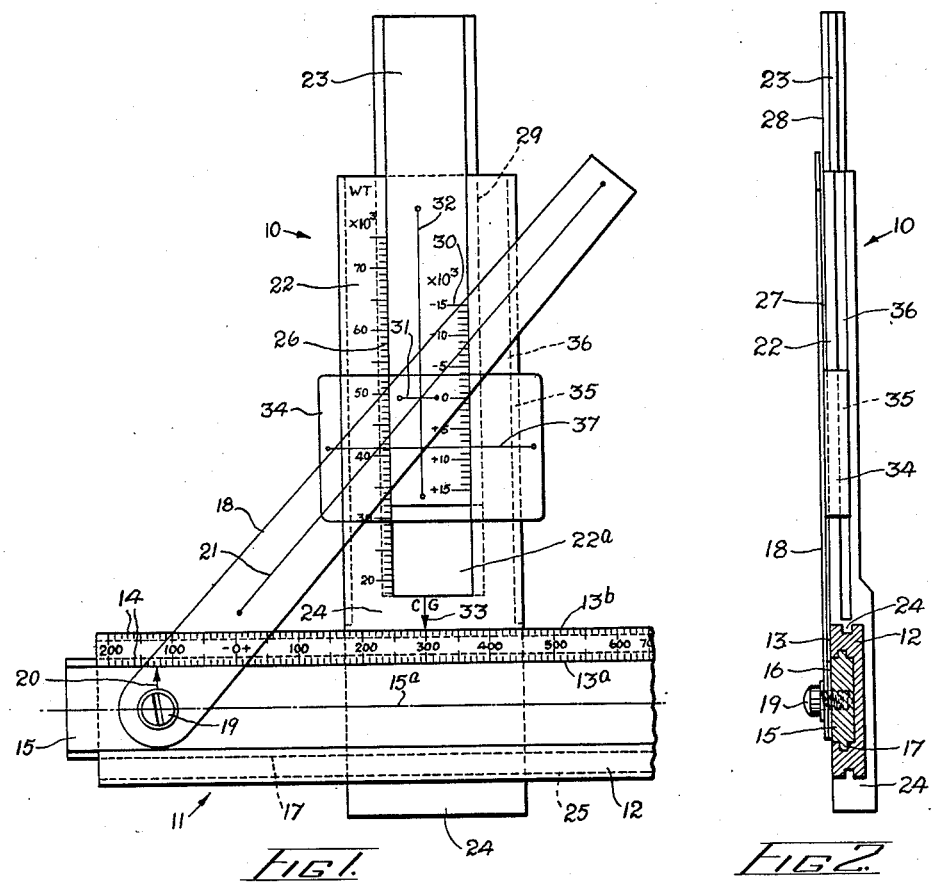
INVENTOR
J.R. FRIESEN
PER
ATTORNEY June 29, 1954     J. R. FRIESEN     2,682,367
WEIGHT AND BALANCE CALCULATOR FOR LOAD CARRYING STRUCTURES
Filed Oct. 30, 1951     2 Sheets—Sheet 2

INVENTOR
J.R.FRIESEN
PER

*Gareth E. Maybee*
ATTORNEY

Patented June 29, 1954

2,682,367

UNITED STATES PATENT OFFICE 2,682,367

WEIGHT AND BALANCE CALCULATOR FOR LOAD CARRYING STRUCTURES

Julius Robert Friesen, New Toronto, Ontario, Canada, assignor to A. V. Roe Canada Limited, Malton, Peel, Ontario, Canada, a corporation Application October 30, 1951, Serial No. 253,803

13 Claims. (Cl. 235—61)

This invention relates to calculators and in particular to centre of gravity or load adjusting calculators for aircraft.

In the design and operation of aircraft it is important that the weight and balance of the aircraft and of its load be frequently checked to verify that the maximum weight permissible for any particular condition (e. g. for take-off or landing) is not exceeded, and that the centre of gravity is located within specified limits of horizontal displacement from some arbitrary datum. It is possible, in the arrangement of equipment or in the distribution of payload, to achieve a condition in which the centre of gravity is located beyond the permissible limits, though the total weight may be below the permissible maximum; moreover, due to the consumption of fuel in flight, the balance or trim of the aircraft may be adversely affected. It will be understood therefore that a ready and accurate means for determining the weight and the centre of gravity position is of great value, since the arithmetical calculations necessary to supply the information are both tedious and long. Yet most of the calculators so far devised for the purpose are complicated, cumbersome or inaccurate, and can be applied to only the specific types of aircraft for which they are designed.

It is therefore an object of this invention to provide a simple, compact and accurate load adjusting calculator for computing the weight and centre of gravity position of a loaded aircraft.

A further object of this invention is to provide a calculator on which progressive calculations can be made but on which a complete recalculation is not required every time a change is made.

Another object of this invention is to provide a calculator that is suitable for all types of aircraft within convenient limits of weight and size.

Other objects and advantages will become apparent during the course of the following description of a preferred embodiment of this invention.

In the accompanying drawings, forming a part of this specification, and in which like reference characters designate like parts throughout the same:

Fig. 1 is a front elevation, partly broken away, of a load adjusting calculator;

Fig. 2 is a side elevation of the calculator shown in Fig. 1;

Figure 3:
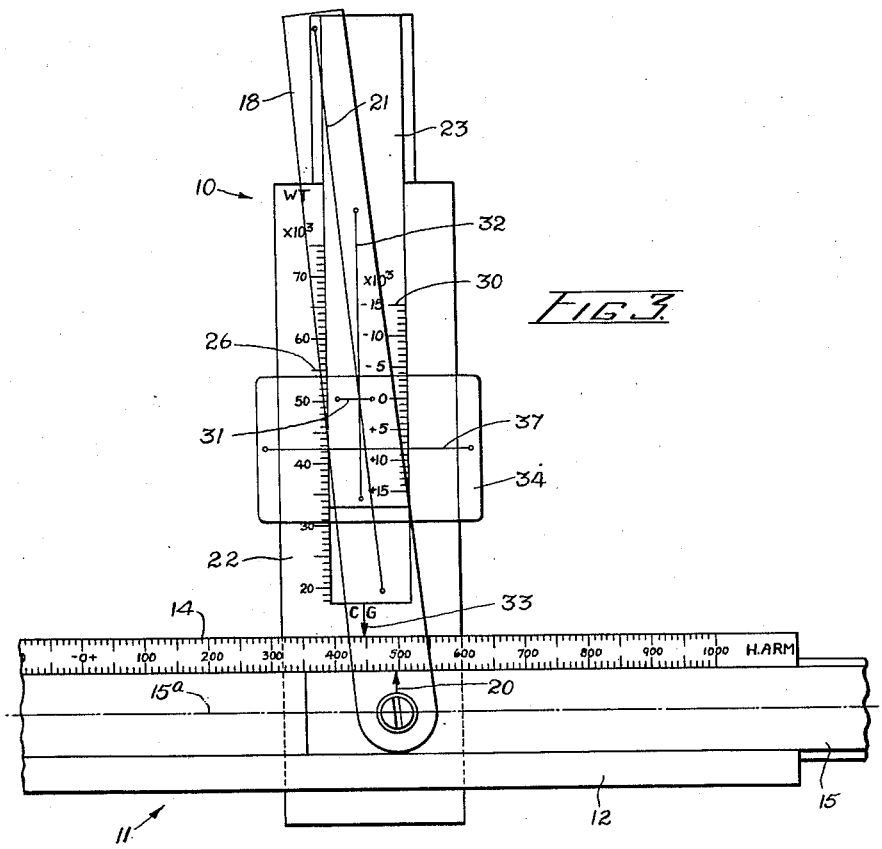
Fig. 3 is a front elevation of the calculator set in accordance with the second step of a typical calculation described herein.

It will be seen from Fig. 1 that the calculator comprises two straight slide rules, generally indicated as 10 and 11, arranged at right angles to each other.

The slide rule 11 has a base 12, on the face 13 of which is inscribed a linear scale 14, reading in inches, to represent the horizontal displacement of a load from an arbitrary datum, marked zero, which may, for example, be the nose of an aircraft or the leading edge of the wing. The scale shown increases positively on one side of the zero datum mark and increases negatively on the other side, to make provision for loads situated either forward of or aft of the datum. The positive portion of the scale is normally chosen to include the centre of gravity position of the unladen aircraft. The graduations of the scale 14 are marked along both the inner edge 13$^a$ and the outer edge 13$^b$ of the face 13. A slide 15, having a surface 16 flush with the face 13 of the base and constructed to slide in internal ways 17 in the base, carries a transparent indicator 18, pivotally mounted on the slide by means of a screw 19, the centre of which is the pivot for the indicator 18. The screw is adjusted to give a degree of frictional stiffness to the pivot, so that the angular relationship between the indicator 18 and the slide 15 will remain at a constant value unless deliberately altered by the operator. The position of the pivot relative to the scale 14 is indicated by a mark or arrow 20 inscribed on the surface 16 and registering on the edge 13$^a$ of the scale, and a straight line 21 is inscribed along the transparent indicator 18 in a radial direction with respect to the pivot.

The slide rule 10 has a base 22 and a slide 23, the base being mounted at right angles to the base 12 by means of bead portions 24, which engage ways 25 running externally along the base 12. The slide 23 runs in a slot 22$^a$ in the base 22, and the slot 22$^a$ ends adjacent the bead portions of the base. A linear scale 26, reading in thousands of pounds, is inscribed on the face 27 of the base 22, the scale readings increasing according to their distance from a zero which would, if marked, lie on a straight line 15$^a$ drawn parallel to the edges 13$^a$ and 13$^b$ through the pivot of the indicator 18. The slide 23 has a surface 28 flush with the face 27 of the base 22 and is constructed to slide in internal ways 29 in the base. The surface 28 is inscribed with a linear scale 30, also reading in thousands of pounds, and drawn to the same scale as the scale 26, the scale 30 extending in both positive and negative directions from a zero mark. The negative graduations are on the side of the zero mark remote from the slide rule 11, and the positive graduations extend from the zero mark towards the slide rule 11. A zero load line 31 is inscribed transversely of the slide 23, at the zero mark on the scale 30. Also inscribed on the slide 23 is a longitudinal reference line 32 which intersects the zero load line 31 at right angles. A mark or arrow 33 is inscribed on a bead portion 24 of the base 22 adjacent the end of the slot 22a and registers on the edge 13b of the scale 14. The arrow is a continuation on the base 22 of the reference line 32 on the slide 23, and in the embodiment shown the arrow is colinear with the reference line.

The slide rule 10 is also provided with a transparent cursor 34, supported by beads 35 which fit in external ways 36 along the base 22. A line 37 is inscribed on the cursor 34 to lie transversely of the sales 26 and 30.

It will be understood that verniers may advantageously be provided for all the scales, but they are not illustrated or described herein in the interest of clarity.

The operation of the calculator is best illustrated by considering a typical loading problem. Let it be assumed that an aircraft having a tare or unladen weight of 42,300 lbs. is to be loaded with the fuel, passengers and cargo shown in the following table. The position of the centre of gravity of the unladen aircraft, in relation to the chosen datum, is always determined during manufacture and, of course, the distances from this datum to the centres of gravity of the various cargoes, fuel tanks and the like are also known. These distances or load arms are included in the table.

| Load Item | Weight, lbs. | Load Arm inches |
|---|---|---|
| Unladen Aircraft | 42,300 | +445 |
| Outboard Wing Fuel | 8,000 | +495 |
| Inboard Wing Fuel | 11,000 | +493 |
| Thirty Passengers | 6,000 | +470 |
| Cargo | 2,000 | |
| Rear stowage | | +800 |
| Forward stowage | | +210 |
| | 69,300 | |

As shown in Fig. 3, the cursor 34 is adjusted until the line 37 inscribed thereon registers with the graduation "42,300" on the scale 26. Then, the slide rule 11 being held stationary, the slide rule 10 is moved transversely until the arrow 33 registers with the graduation "+445" on the scale 14. These two operations establish the basic setting of the calculator. The individual loads and their corresponding load arms are now applied one by one. To add the outboard wing fuel load of 8000 lbs. the slide 23 is moved until the graduation "+8000" on the scale 30 registers with the cursor line 37; the load arm of the outboard wing fuel is applied by moving the slide 15 until the arrow 20 registers on the graduation "+495" on the scale 14. The transparent indicator 18 is then rotated until the line 21 crosses the intersection of the zero load line 31 and the reference line 32. This sets all parts of the calculator in the positions shown in Fig. 3. The angular relationship between the indicator 18 and the slide 15 is then maintained, and the slide rule 10 is moved in relation to the slide rule 11 until the reference line 32 is below the point of intersection of the line 21 and the cursor line 37. The cumulative weight of the unladen aircraft and this fuel load is then determined by moving the cursor 34 until its line 37 is superimposed upon the zero load line 31; in this position the line 37 registers with the graduation "50,300" on the scale 26. The position of the centre of gravity of the aircraft so loaded with fuel is read off the scale 14 opposite the arrow 33 and is found to be "+453."

To understand the theory of operation, let it be assumed that the position of the centre of gravity of the aircraft loaded with its outboard wing fuel is Y inches from the datum. The weight of the aircraft plus fuel is $42{,}300 + 8000 = 50{,}300$ lbs. Then, taking moments about the datum, $$50{,}300 \times Y = 42{,}300 \times 445 + 8000 \times 495$$

which reduces to $$\frac{50{,}300}{495-445} = \frac{8000}{Y-445}$$

Figure 4:
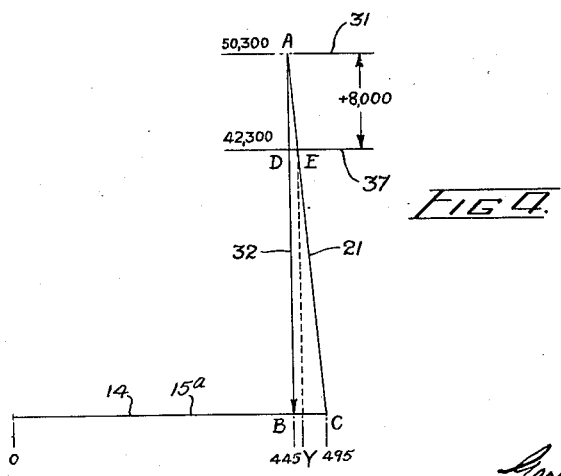
Fig. 4 is a geometrical diagram for explaining the theory of operation of the calculator.

The setting in Fig. 3 is shown geometrically in Fig. 4, in which, for simplicity, the scale 14 is shown superimposed on the line 15a. It will be observed that when the graduation "+8000" on the slide is set opposite the graduation "42,300" under the line 37 of the cursor, the zero load line 31 is thereby set opposite the graduation "50,300," so that by moving the cursor reference line 37 up to the zero load line the weight of the aircraft plus fuel may be read, as described above. It will be noted that a right angled triangle ABC is defined by the lines 32, 15a and 21, and $$\frac{AB}{BC} = \frac{50{,}300}{495-445}$$

The cursor line 37 intersects AB at D and AC at E, and from similar triangles $$\frac{AB}{BC} = \frac{AD}{DE}$$

or $$\frac{50{,}300}{495-445} = \frac{8000}{DE}$$

But it was found, when taking moments, that $$\frac{50{,}300}{495-445} = \frac{8000}{Y-445}$$

Therefore $$DE = Y - 445$$

Thus, by moving the reference line 32 to the dotted position shown in Fig. 4, where it passes through E, Y may be read from the scale 14 as "+453."

It will be clear from this discussion that the calculator operates on the principle of similar triangles; the triangle ABC need not be a right-angled triangle, and the slide rules 10 and 11 need not, therefore, be at right angles to each other. Also, the construction may be simplified by eliminating the slide 23 and the cursor 34, because if the reference line 32 and its colinear arrow 33 are inscribed along the edge of the scale 26, the operator can add the weights by simple arithmetic and set the line 21 at the appropriate points along the scale 26. The calculator may therefore be regarded as comprising a first part 10 and a second part 11 slidably engaging each other, the second part including a first element 12 and a second element 15, the first and second elements slidably engaging each other and the second element having a pivotally mounted indicator 18.

Reverting to the description of the manipulation of the calculator, by a series of operations similar to those already described, the loads of the inboard wing fuel, the passengers and the cargo are added, bringing the total gross weight to 69,300 lbs., which is, of course, the total of the weight column in the table, and, assuming that all the cargo is stowed in the rear stowage, the position of the centre of gravity of the fully loaded aircraft is found to be 471 inches aft of the datum.

Now let it be assumed that the aircraft considered in this example has a maximum allowable gross weight for take-off of 70,000 lbs. and that for stability the centre of gravity must lie between 450 inches and 465 inches aft of the datum. It will be seen from the foregoing that the aircraft, though loaded within the maximum permissible gross weight, has a load distribution which places the position of the centre of gravity outside the permissible limits. To correct this condition, a 1000-lb. load may be removed from the rear cargo stowage and repositioned in the forward stowage. The effect of this change upon the position of the centre of gravity can be readily determined by the calculator in the following manner.

It is first necessary to indicate the removal of the 1000-lb. load at a distance of 800 inches aft of the datum. The slide 23 is moved until the graduation "−1000" registers with the cursor line 37. The slide 15 is moved until the arrow 20 registers with the graduation "+800" on the scale 14. The indicator 18 is rotated until its line 21 is superimposed upon the intersection of the zero load line 31 and the reference line 32 and, while the resultant angular relationship between the indicator 18 and the slide 15 is maintained, the slide rule 10 is moved until the line 21 is superimposed upon the intersection of the reference line 32 and the cursor line 37. The cursor is then moved until its line 37 is superimposed upon the zero line 31, indicating a gross load of 68,300 lbs. on the scale 26, and the arrow 33 registers with the scale 14 to indicate that the position of the centre of gravity, in this load condition, is at 466 inches aft of the datum.

In the manner previously described, settings are now made for the 1000-lb. load repositioned in the aircraft in the forward stowage, having a load arm of 210 inches aft of the datum, and it is found that the gross weight of the loaded aircraft is again 69,300 lbs. but with a centre of gravity situated 462 inches aft of the datum, within the permissible limits.

It is thought that the foregoing example illustrates the manner in which loads and their respective load arms may be added or subtracted by means of the calculator to show the resultant position of the centre of gravity. All the scales are linear and the calculator is not restricted to any particular aircraft. It is convenient, in the interest of size, to limit the range of the scale 26; for example the scale illustrated in the drawings is applicable to aircraft in the 20,000-lb. to 70,000-lb. class, and the scale is not extended much beyond these extremes. It is therefore to be understood that the form of the invention herewith shown and described is to be taken as a preferred example of the same and that various changes in the shape, size and arrangement of the parts may be resorted to without departing from the spirit of the invention or the scope of the subjoined claims.

What I claim as my invention is:

1. A calculator for determining the position of the centre of gravity of a load-carrying structure, comprising two indicia bearing parts slidably engaging each other, the second part comprising a first and a second element slidably engaging each other; indicia on the first element including a graduated scale indicating the positions of loads; indicia on the first part including a reference line angularly disposed relative to the first element, an indicium registering with the scale of the first element, and a graduated scale indicating the magnitudes of loads; an indicium on the second element registering with the scale of the first element; and an indicator pivotally mounted on the second element and cooperating with indicia of the first part.

2. A calculator comprising two indicia bearing straight slide rules each having a base and a slide, the first slide rule being angularly disposed relative to the second slide rule, guides being provided to support the base of the first slide rule slidably in a longitudinal direction of the second slide rule, indicia on the base of the second slide rule registering with an indicium on the base of the first slide rule, a cursor slidably mounted on the first slide rule, and an indicator pivotally mounted on the slide of the second slide rule and cooperating with indicia on the first slide rule.

3. A calculator for determining the position of the centre of gravity of a load-carrying structure, comprising two indicia bearing straight slide rules each having a base and a slide, the first slide rule being angularly disposed relative to the second slide rule, guides being provided to support the base of the first slide rule slidably in a longitudinal direction of the second slide rule, indicia on the base of the second slide rule including a graduated scale indicating the positions of loads, indicia on the base and slide of the first slide rule including graduated scales indicating the magnitudes of loads and also including an indicium registering with the scale on the base of the second slide rule, a cursor slidably mounted on the first slide rule, and an indicator pivotally mounted on the slide of the second slide rule and cooperating with indicia on the first slide rule.

4. A calculator for determining the position of the centre of gravity of a load-carrying structure, comprising two straight slide rules each having a base and a slide, the first slide rule being angularly disposed relative to the second slide rule, guides being provided to support the base of the first slide rule slidably in a longitudinal direction of the second slide rule, a graduated scale on the base of the second slide rule indicating the positions of loads, a graduated scale on the base of the first slide rule indicating gross weight, a graduated scale on the slide of the first slide rule extending from a zero mark and indicating added loads, a reference line longitudinal of the first slide rule intersecting the zero mark and registering with the scale on the base of the second slide rule, a cursor slidably mounted on the first slide rule, and an indicator pivotally mounted on the slide of the second slide rule and cooperating with the indicia on the first slide rule.

5. A calculator for determining the position of the centre of gravity of a load-carrying structure, comprising two straight slide rules each having a base and a slide, the first slide rule being disposed at right angles to the second slide rule, guides being provided to support the base of the first slide rule slidably in a longitudinal direction of the second slide rule, a linear scale on the base of the first slide rule indicating gross weight, a linear scale on the slide of the first slide rule extending in opposite directions from a zero mark and indicating added and subtracted loads, a reference line longitudinal of the first slide rule intersecting the zero mark, a cursor slidably mounted on the first slide rule, a pivot on the slide of the second slide rule, an indicator pivotally mounted on the pivot and having a straight line marked radially relative to the pivot, said indicator being movable to superimpose said line on the point of intersection of the zero mark and the reference line on the first slide rule, and a linear scale on the base of the second slide rule having a datum mark and indicating the distance of the reference line from the datum mark and the distance of the pivot from the datum mark, the distances being measured perpendicularly to the reference line.

6. A calculator comprising two straight slide rules each having a base and a slide, the first slide rule being disposed at right angles to the second slide rule, guides being provided to support the base of the first slide rule slidably in a longitudinal direction of the second slide rule, a graduated scale on the base of the second slide rule, a graduated scale on the base of the first slide rule, a graduated scale on the slide of the first slide rule and having a zero mark, a longitudinal reference line on the slide of the first slide rule intersecting the zero mark, a mark on the base of the first slide rule colinear with the reference line and registering with the scale on the base of the second slide rule, a cursor slidably mounted on the first slide rule, a pivot on the slide of the second slide rule, an indicator pivotally mounted on the pivot and adapted to be superimposed on the point of intersection of the zero mark and the reference line on the slide of the first slide rule, and a mark on the slide of the second slide rule lying on the perpendicular from the pivot to the scale on the base of the second slide rule and registering with the scale.

7. A calculator for determining the centre of gravity of a load carrying structure, comprising two indicia bearing parts, the second part comprising a first and a second element; indicia on the first element indicating the positions of loads relative to a datum, indicia on the first part indicating the magnitudes of loads, the indicia on the first part being angularly disposed relative to the indicia on the first element, the indicia on the first part including indicating means on the first part registering with the indicia on the first element; indicating means on the second element registering with the indicia on the first element; and an indicator pivotally mounted on the second element and cooperating with the indicia on the first part; the first part, first element and second element being relatively slidable whereby the point of registration of said indicating means on the first part with the indicia on the first element as well as the point of registration of said indicating means on the second element with the indicia on the first element can be varied.

8. A calculator as claimed in claim 7, in which the indicia on the first element and on the first part comprise graduated scales.

9. A calculator as claimed in claim 7, in which the indicating means on the first part as a reference line angularly disposed relative to the indicia on the first element.

10. A calculator as claimed in claim 7, in which the first part is a straight slide rule angularly disposed relative to the second part, said slide rule having a base portion and a slide portion, the indicia on the first part comprising a scale on one of said portions of the slide rule indicating gross weight and a scale in the other of said portions indicating added loads.

11. A calculator as claimed in claim 10, in which the indicating means on the first part is a reference line on the slide rule, the slide rule has a cursor, and the pivotally mounted indicator cooperates with said reference line and cursor.

12. A calculator for determining the centre of gravity of a load carrying structure, comprising two indicia bearing parts, the second part comprising a first and a second element; indicia on the first element including a graduated scale indicating the positions of loads relative to a datum; indicia on the first part indicating the magnitudes of loads and including a reference line angularly disposed relative to the first element and registering with the scale; indicating means on the second element registering with the scale; the first part, first element and second element being relatively slidable whereby the points of registration of said reference line and said indicating means with said scale can be varied; and an indicator pivotally mounted on the second element and adapted to be disposed in substantially triangular relationship with said scale and said reference line.

13. A calculator for determining the centre of gravity of a load carrying structure, comprising two indicia bearing parts, the second part comprising a first and a second element, indicia on the first element indicating the positions of loads relative to a datum, indicia on the first part indicating the magnitudes of loads, the indicia on the first part being angularly disposed relative to the indicia of the first element and including indicating means registering with the indicia of the first element, indicating means on the second element registering with the indicia of the first element, and an indicator pivotally mounted on the second element and cooperating with the indicia on the first part, the first part and the second element being slidable longitudinally of the first element whereby the points of registration of the indicating means on the first part and on the second element with the indicia on the first element can be varied, the first part and the second element being slidable in separate paths so that the indicating means on the second element can be shifted to the right or the left of the indicating means on the first part.

References Cited in the file of this patent

UNITED STATES PATENTS

| Number | Name | Date |
|---|---|---|
| 1,200,569 | Young | Oct. 10, 1916 |
| 1,965,017 | Wellington | July 3, 1934 |
| 2,193,280 | Gunning | Mar. 12, 1940 |
| 2,296,692 | Thurston | Sept. 22, 1942 |
| 2,300,401 | Basler et al. | Nov. 3, 1942 |
| 2,432,738 | Fairbanks | Dec. 16, 1947 |
| 2,444,693 | Comstock | July 6, 1948 |